No. 741,592. PATENTED OCT. 13, 1903.
I. L. ROBERTS.
ELECTROLYTIC DIAPHRAGM.
APPLICATION FILED MAR. 7, 1903.
NO MODEL.

Witnesses:
Raphaël Netter
S. T. Dunham

Isaiah L. Roberts, Inventor
by Kerr, Page & Cooper Att'ys

No. 741,592. Patented October 13, 1903.

UNITED STATES PATENT OFFICE.

ISAIAH L. ROBERTS, OF NEW YORK, N. Y., ASSIGNOR TO THE ROBERTS BATTERY COMPANY, A CORPORATION OF NEW YORK.

ELECTROLYTIC DIAPHRAGM.

SPECIFICATION forming part of Letters Patent No. 741,592, dated October 13, 1903.

Application filed March 7, 1903. Serial No. 146,625. (No model.)

*To all whom it may concern:*

Be it known that I, ISAIAH L. ROBERTS, a citizen of the United States, residing at New York, county of Kings, State of New York, have invented certain new and useful Improvements in Electrolytic Diaphragms, of which the following is a specification, reference being had to the drawings accompanying and forming part of the same.

My invention relates to diaphragms used in electric batteries or electrolytic cells to separate the two fluids of the kind which are substantially impervious to the physical transfusion of the liquids on open circuit, but at the same time permit electrolytic action to take place between the same when the circuit is closed. In prior patents granted to me and in conjunction with another these diaphragms are described as made of a gelatinous substance combined with a holder. The gelatinous substance may be composed of starch, flour, &c., an insoluble saponified material, or preferably of a mineral substance, such as sodium or potassium silicate gelatinized by an acid or a salt of a metal. The holder may be of two or more sheets of felt or cloth, between which the gelatinous material is held, or cloth felt or porous earthenware impregnated with the gelatin.

In a battery wherein acids are used or where chlorin or bromin is evolved it is not practicable to use a diaphragm composed even in part of organic material, because such matter is attacked and speedily destroyed by the acids or gases. In such cases it is necessary that only inorganic materials be used in the holder or gelatinous substance. Thus in an electric battery in which a solution of chromic or other corrosive acid is used I have found it necessary to employ a plate or cup of porous earthenware as the holder for the gelatinous material. This combination of course resists the acid; but the earthenware is rigid and fragile, which qualities are serious disadvantages when the batteries are used under circumstances which subject them to shocks and jolts, as in self-propelled vehicles. Here the cups or plates of earthenware are soon broken and the battery thereby rendered useless; also, such batteries are at times required, as when propelling the vehicle up a hill, to have a high rate of current output, which necessitates that both positive and negative electrodes have large surface area and that they be placed very close to the separating-diaphragm. This great surface area and proximity of elements can only be obtained within the necessary limitations as to the size of the battery by the use of flat electrodes and diaphragms. It has been found impracticable, however, to make the earthenware diaphragms sufficiently flat for the purpose, for the reason that they almost invariably warp badly in baking. This warping makes it impossible to secure them properly in place in the battery.

The considerations just mentioned also require that the separating-diaphragms have a very low resistance and permit of electrolytic action in and through them to the greatest possible extent. To secure these advantages, it is necessary that the diaphragms be composed as far as practicable of the gelatinous material and a minimum proportion of the holder or support. In the case of earthenware it is obvious that the chemical and electrolytic action can take place only through the pores, and since these are small and tortuous the rate of current output is correspondingly low. If the plate or cup is made more porous to obtain a higher rate, it then becomes far too fragile for practical use.

My invention obviates the difficulties inherent in all other forms of diaphragms of this class and combines the essential features of indestructibility, flexibility, and great porosity, all of which together are not possessed by any other. To these ends the invention consists, broadly, in a diaphragm made of glass-cloth, having its interstices filled with gelatinous material. Such a diaphragm will resist the action of the strongest acids. On account of its flexibility it is easily secured in place in the battery and will stand severe jolting without injury. The interstices or pores of the cloth being larger than in the earthenware articles hold a larger proportion of the gelatinous electrolyte and admit of a much higher rate of current output. The glass-cloth which I have found best suited for the purpose is tightly woven of very finely-spun filaments of glass, a large number of such filaments composing each thread of the warp and woof. This makes a fabric of close texture containing innumerable spaces or pores of comparatively small dimensions, which are filled with the gelatinous electrolyte.

Referring now to the drawings, Figure 1 shows the preferred form of my invention in section. Fig. 2 is an alternative form, and Fig. 3 is an enlarged detail in section of a diaphragm composed of a single sheet of the glass-cloth.

Throughout the figures, 1 indicates the holder composed of glass-cloth, and 2 the gelatinous material with which it is impregnated. In the form shown in Fig. 1 the sheets of cloth are such, preferably separated a slight distance apart by placing threads or strands of glass between them at suitable intervals. The sheets are then secured together in any convenient manner, preferably by "quilting" them—that is, sewing them with glass thread in a series of parallel seams, then by a second similar series at an angle to the first. Being thus separated, as in Fig. 1, they will hold more of the gelatin than when secured together in the close juxtaposition of Fig. 2.

The preferred way of using the diaphragms is in a battery or electrolytic cell composed of a number of frame-sections, on which the diaphragm or diaphragms are secured, the whole being bound firmly together, forming compartments for the elements and their appropriate solutions. This method is shown, for example, in my prior patent, No. 442,396, granted December 9, 1890.

The glass-cloth may be filled with the gelatinous material before it is placed in the battery; but my preferred method is to secure it in position in the battery before it is so impregnated and then to fill the compartments on either side with a solution of sodium silicate, which is allowed to remain until the interstices are filled with it, when it is removed and a dilute solution of sulfuric or hydrochloric acid is put in its place. In the course of a little time the silicate will be gelatinized, and the acid is then removed.

Having now fully described my invention and the preferred manner of using the same, what I claim is—

1. In an electrolytic diaphragm, the combination with a holder or support composed of glass-cloth, of a filling of gelatinous material which will permit electrolytic action to take place through the same without physical transfusion of the liquids, as set forth.

2. In an electrolytic diaphragm, the combination with a holder or support composed of glass-cloth, of a filling of inorganic gelatinous material, as and for the purposes set forth.

3. In an electrolytic diaphragm, the combination with a holder or support composed of a plurality of thicknesses of glass-cloth, of a filling of inorganic gelatinous material, as and for the purposes set forth.

4. In an electrolytic diaphragm, the combination with a holder or support composed of a plurality of slightly-separated thicknesses of glass-cloth, and a filling of inorganic gelatinous material, as and for the purposes set forth.

ISAIAH L. ROBERTS.

Witnesses:
S. S. DUNHAM,
M. LAWSON DYER.